United States Patent [19]

Ewert

[11] Patent Number: 4,901,224
[45] Date of Patent: Feb. 13, 1990

[54] PARALLEL DIGITAL PROCESSOR

[76] Inventor: Alfred P. Ewert, 1088 Park Ave., New York, N.Y. 10022

[21] Appl. No.: 704,919

[22] Filed: Feb. 25, 1985

[51] Int. Cl.[4] ............................................. G06F 13/00
[52] U.S. Cl. .................................. 364/200; 364/231.9; 364/229.0; 364/229.4
[58] Field of Search ................. 364/200 MS, 900 MS; 382/14, 34, 41

[56] References Cited

U.S. PATENT DOCUMENTS

| | | | |
|---|---|---|---|
| 3,226,688 | 12/1965 | Amdahl et al. | 364/200 |
| 3,226,692 | 12/1965 | Fuller et al. | 364/200 |
| 4,071,890 | 1/1978 | Pandeya | 364/200 |
| 4,104,720 | 8/1978 | Gruner | 364/200 |
| 4,144,566 | 3/1979 | Timsit | 364/200 |
| 4,241,411 | 12/1980 | Krasner et al. | 364/726 |
| 4,334,285 | 6/1982 | Kawakita et al. | 364/761 |
| 4,344,134 | 8/1982 | Barnes | 364/200 |
| 4,365,292 | 12/1982 | Barnes et al. | 364/200 |
| 4,380,046 | 4/1983 | Fung | 364/200 |
| 4,384,273 | 5/1983 | Ackland et al. | 382/34 |
| 4,412,283 | 10/1983 | Mor et al. | 364/200 |
| 4,468,727 | 8/1984 | Carrison et al. | 364/200 |
| 4,481,580 | 11/1984 | Martin et al. | 364/200 |

OTHER PUBLICATIONS

Manuel, Tom; "Parallel Processing: Advanced Parallel Architectures Get Attention as Ways to Faster Computing", Electronics, Jun., 1983.
Riganati, John P. & Schneck, Paul B.: "Supercomputing"; I.E.E.E., Oct., 1984.
Lerner, Eric J.; "Data-flow Architecture"; I.E.E.E. Spectrum; Apr., 1984.
Azkharov, Vasilii; "Parallelism and Array Processing"; I.E.E.E., Transactions on Computers, vol. C-33, No. 1, Jan. 1984.
Iversen, Wesley R.; "New CMOS Processes Data in Parallel"; Electronics Week, Nov. 12, 1984.
Davis, Dwight B.; "Super Computers: A Strategic Imperative?", High Technology, May 1984.

Primary Examiner—Raulfe B. Zache
Assistant Examiner—Jonathan C. Fairbanks
Attorney, Agent, or Firm—Morgan & Finnegan

[57] ABSTRACT

A digital computer system including a large number of parallel processing modules (PPM's). Each PPM includes an arithmetic logic unit (ALU), an instruction decoder, and internal bus switching. The main memory is organized in columns and rows with a separate column for each PPM port. Each PPM preferably includes at least three ports to permit parallel transfer of instructions and data to the PPM's. The ports of the PPM's are also connected to segmented lateral transfer buses which operate in conjunction with the internal bus switching of the PPM's to permit tandem ALU operation.

19 Claims, 7 Drawing Sheets

```
                    1 0 1 1         MULTIPLICAND = 11
                    0 1 0 1         MULTIPLIER = 5
                    ─────────
(1)                 1 0 1 1 | 1
(2)              ─0─1─1─0─|─0─
(3)            1 0 1 1 0 0 | 1
(4)         ─0─1─1─0─0─0─|─0─
                    ─────────
            1 1 0 1 1 1          PRODUCT = 55
```

FIG. 5C STEP ONE
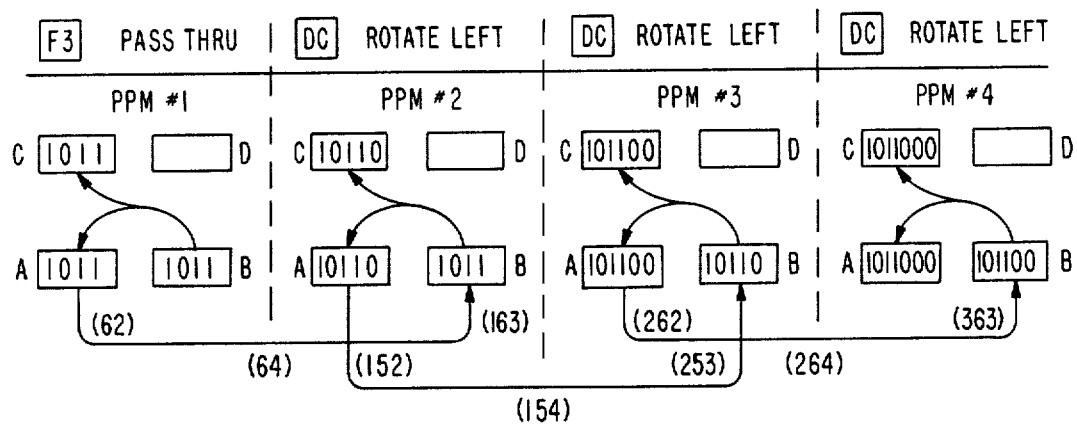
FIG. 5D STEP TWO
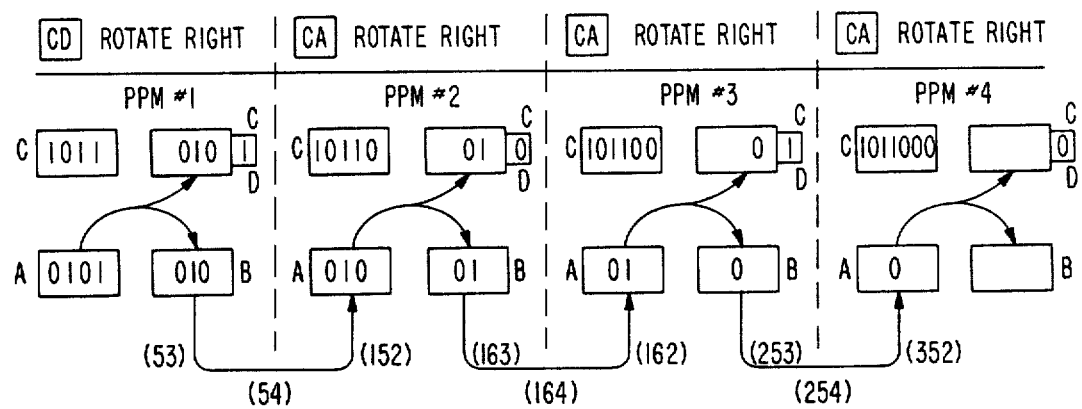
FIG. 5E STEP THREE
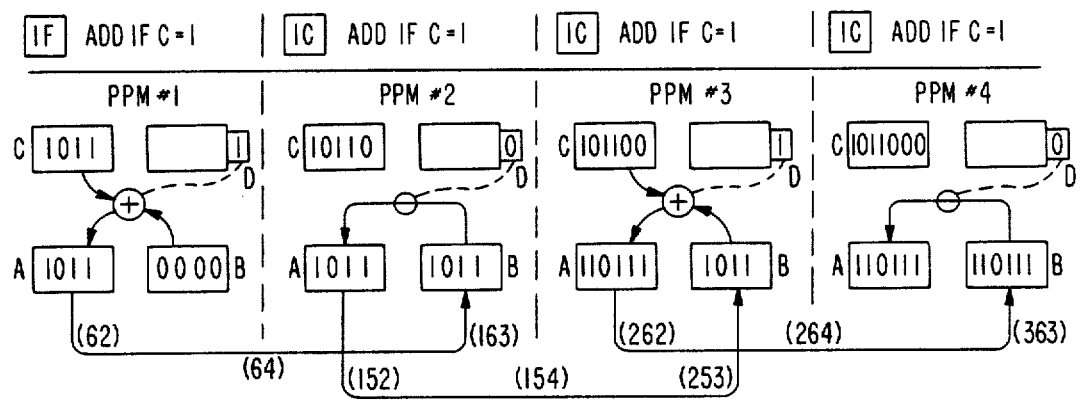

PARALLEL DIGITAL PROCESSOR

This invention relates to a general purpose computer and, more particularly, to a high speed computer employing parallel architecture.

BACKGROUND OF THE INVENTION

In recent decades computer electronics have rapidly advanced through four generations: vacuum tubes, transistors, integrated circuits, and very large scale integrated (VLSI) circuits. These four generations have improved computer performance by several orders of magnitude while at the same time dramatically reducing cost. Despite these tremendous advances, a present need exists for further improvement by several orders of magnitude in order to solve forseeable problems in advanced technical areas.

Most computers have been designed using the serial processor model proposed by John Van Neumann. In the classic architecture according to Van Neumann, a single stream of instructions is fed to a single processor and processed in the order received. Data is taken from memory bin locations, processed, and then returned to the same or different bin location. The programing languages are sequential, being designed to follow the serial architecture of the computer. In such serial systems, processing speed depends on the operating speed of the components. Since the component operating speed is not likely to increase significantly in the future, various parallel or concurrent processing techniques have been explored.

The commercial efforts from companies like Cray Research and Control Data in the United States and Hitachi Ltd., Fijitsu Ltd. and NEC Corp. of Japan have resulted in the so-called "supercomputers". These computer systems make extensive use of concurrent processing techniques called pipelining and vectoring. In pipelining tasks are divided up so they can be performed concurrently. For example, one section may fetch instructions while a different section processes a previously fetched instruction. Thus, while one instruction is being executed, the next instruction is simultaneously being fetched. By overlapping tasks in this fashion the operating speed on the computer can be increased. Vectoring is a somewhat similar technique involving organization of data for processing in pipeline fashion. These supercomputers also sometimes use more than one high speed processor in combination with "look-ahead" techniques in order to co-process the program where data needs do not overlap. However, the supercomputers are basically very high speed serial processors rather than parallel processors and, therefor, the extent to which concurrent processing can be incorporated is limited.

Other efforts, mostly experimental efforts at universities, have been directed toward developing systems utilizing huge numbers of processors operating in parallel. Many of these efforts, like the Illiac IV computer at the University of Illinois, have involved special purpose computations, usually problems of a generally parallel character. For example, picture processing systems normally divide the picture into individual pixels each of which can then be processed concurrently following the same program. Such systems are characterized by a single instruction, multiple data, type of flow through the system. This approach does not have general application and is limited in usefulness to what are basically parallel problems.

Parallel processor systems with dynamic configurations have been proposed, as for example, the Blue Chip project at Purdue University. These systems include a large switching array capable of connecting each of the processors to selected ones of its neighbors. Each processor includes its own local memory and program. Unfortunately, the switching array becomes inordinately complex as the computer increases in size because of the increasing number of switching possibilities. Thus, the concept is difficult to expand into a large computing machine.

Several experimental computers have been constructed following the data-flow concept. According to this concept, control of the program execution is determined by the arrival of the data. The data is normally tagged so the data for a particular calculation can be identified on arrival. The processors operate individually without a central program counter and send out tagged results to other processors when the processing operation is complete. The data-flow computer automatically exploits the parallelism existing in problems because all instructions for which data is available can be executed at the same time if sufficient processors are available. Although this approach is thought to be promising, effective software has not yet been devised. Also this approach suffers from either high data switching overhead or data transfer bottlenecks and the need for data recognition processing at the individual processors.

A binary tree configuration has been proposed by Gyula Mago at the University of North Carolina. The main processing elements, including individual memory units, are referred to as the leaves and can pass data up the tree (actually an inverted tree) or receive data moving down the tree. Data passing through the node points can also be processed. The computer operates by moving data in waves up and down the tree structure which permits lateral as well as vertical data movement. The concept is interesting but has yet to be implemented in a large high speed computer.

SUMMARY OF THE INVENTION

The system according to the invention can include any desired number of parallel processing modules (PPM). Each module includes three or more ports (e.g. 8 bit parallel format), one such port being for command instructions and the other ports being for data communication. The principal elements of the PPM are an ALU (arithmetic logic unit), an instruction decoder, and internal bus switching control.

The memory for the system is organized in rows and columns with a separate memory column associated with each PPM port. Instructions and data are moved from the memory to the processing modules row at a time, i.e., all in parallel. The typical operating sequence includes three operating modes. In the first mode of the sequence data and instructions are loaded in parallel into all the PPM's. Next is the execute mode wherein the ALU operates on the data according to the command instruction. Thereafter there may be an unload mode where data is transferred from the PPM's to a row in memory which can either be the same row from which data originated or another row offset therefrom.

In the typical microprocessor operating according to the Van Neumann approach, many sequential steps are required and each such step requires a finite interval.

For example, a simple addition of two numbers requires at least eight steps to fetch instructions, to fetch data, to execute the ALU operation and to return the result to memory. By comparison, the system according to the invention could perform the same operation using one of its PPM's and only requires three steps since the instructions and data are loaded simultaneously in parallel. Meanwhile, other PPMs in the system can simultaneously perform other additions or operations on other data. By paralleling the loading operations to the PPM's (instructions and data simultaneously) and by paralleling the PPM's, substantial increases in operating speed of the computing system can be realized. With the system as thus far described, the parallelism in operation depends largely on the degree of parallelism in the problem being solved and is achieved at the expense of less efficient memory usage. Since electrostatic memory is now relatively inexpensive, the efficiency loss in memory utilization is not a serious problem.

In the system according to the invention the degree of parallel operation is greatly enhanced and made largely independent of parallelism in the problem being solved through the use of segmented lateral transfer buses and internal PPM switching configurations. By being able to transfer data laterally, i.e., between PPM's or between columns in memory, it becomes possible to move a data byte to any desired PPM or memory cell, a feature important to achieving general purpose utility for the system. More important, however, is that the internal switching and lateral transfer permit the output of one ALU to be coupled to the input of another ALU for tandem operation. Thus, serial steps in a problem can be executed at the same time by several different PPM's operating in tandem. As a result, the system can be dynamically configured for full parallel PPM operation almost regardless of parallelism in the problem being solved.

BRIEF DESCRIPTION OF THE DRAWINGS

The features of the invention are described in detail with reference to the following drawings which form part of the specification.

FIG. 5A is an illustration showing multiplication of two four digit binary numbers; FIG. 5B is a program for the co-logic computer for multiplying two four digit binary numbers; FIGS. 5C, 5D, 5E are flow diagrams showing the multiplication being carried out.

GENERAL LAYOUT FOR THE CO-LOGIC PROCESSOR

Figure 1:
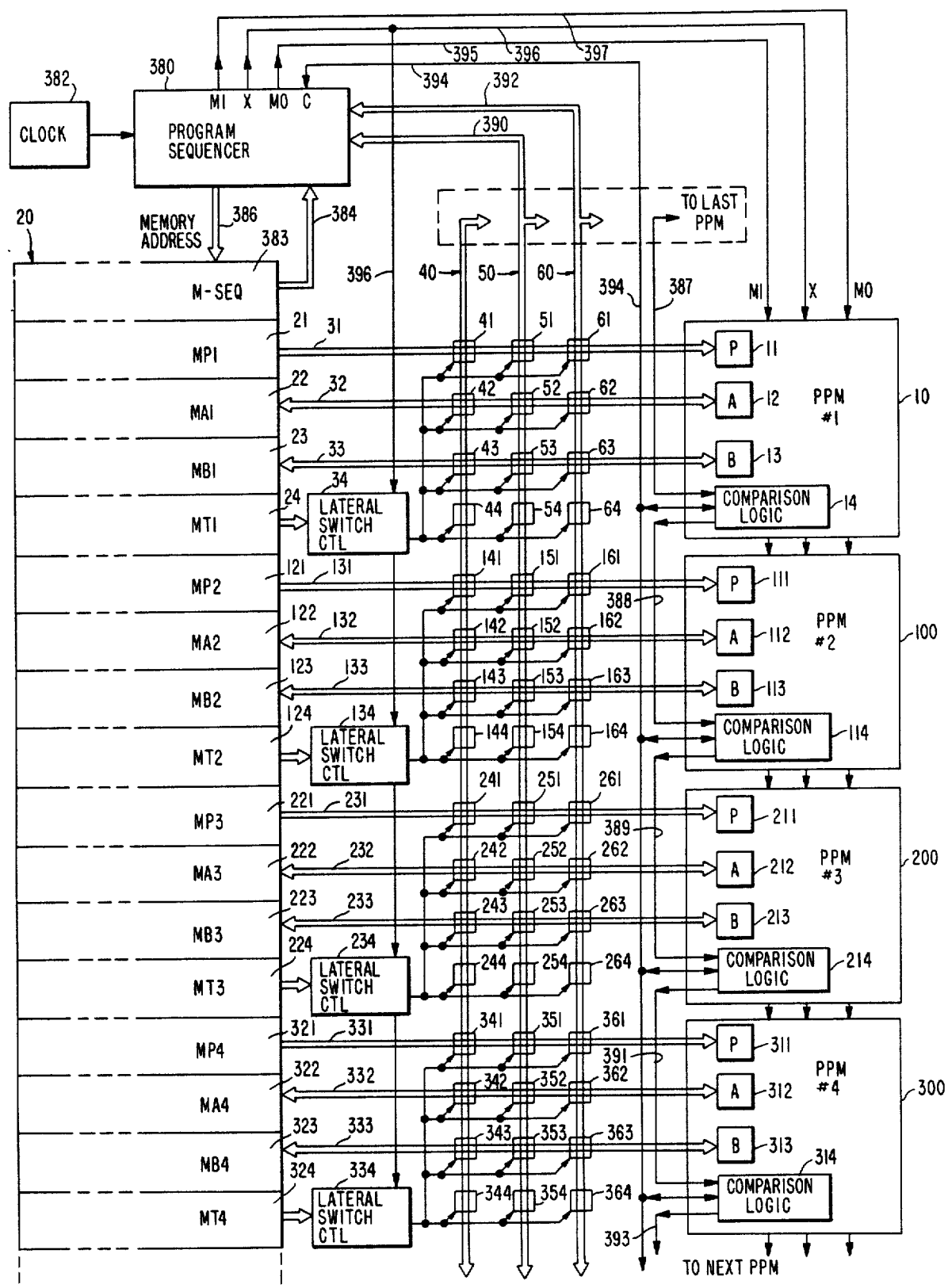
FIG. 1 is a schematic block diagram illustrating the general layout for the co-logic processor according to the invention.
Figure 3:
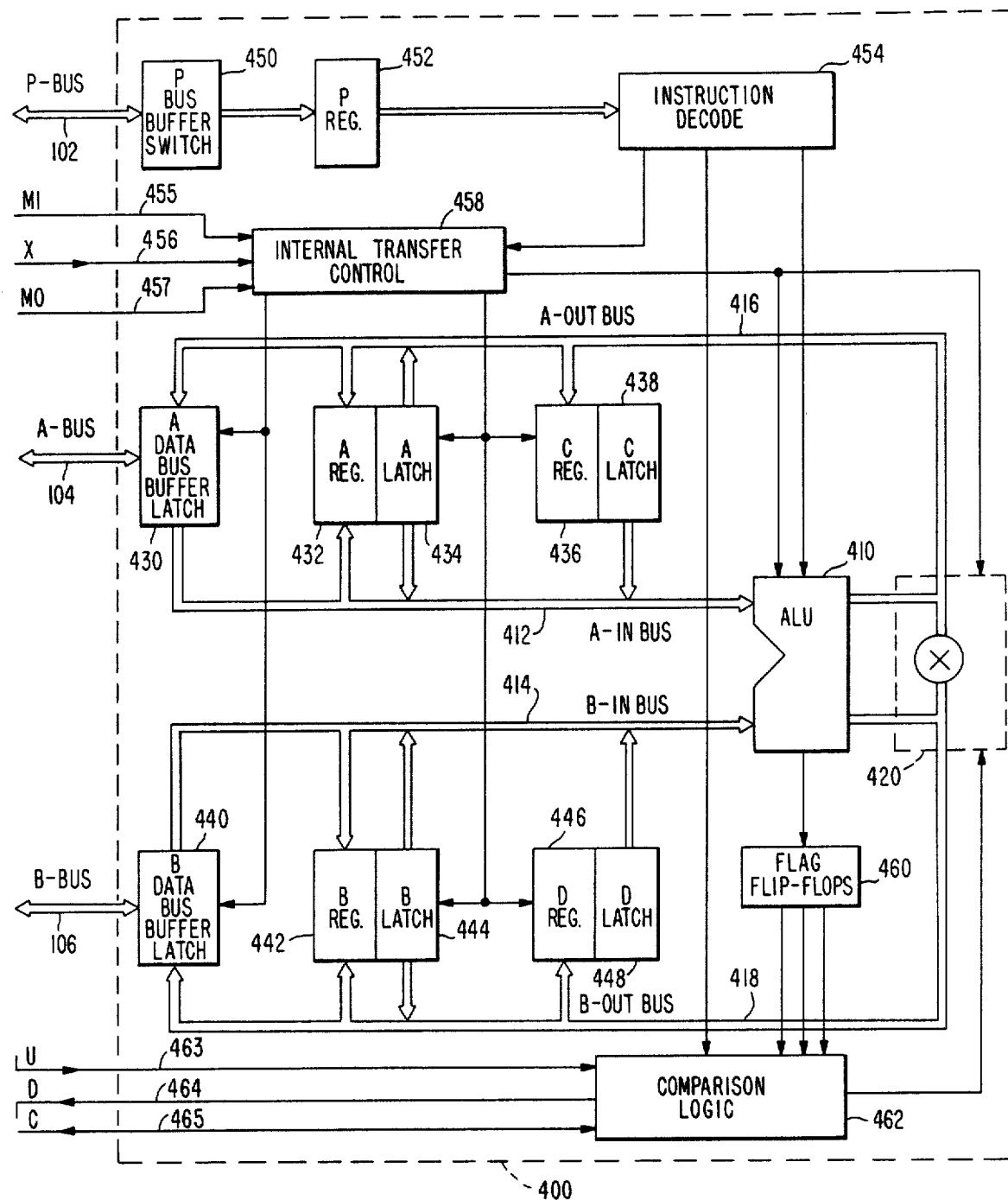
FIG. 3 is a schematic block diagram of a parallel processing module (PPM) according to the invention.

The general layout for the system according to the invention is shown as a schematic block diagram in FIG. 1 including any desired number of parallel processing modules (PPM's). In FIG. 1 four PPM's 10, 100, 200 and 300 are shown, but any desired number can be included. The details of the PPM's are illustrated in FIG. 3. Each PPM includes three ports, one associated with each of the P, A, and B registers 11, 12 and 13 in the PPM.

The main memory 20 is electrostatic random access memory (RAM) organized in columns and rows. A separate memory column is associated with each PPM port. The MP1 column 21 of memory 20 is coupled to P register 11 via a P-bus 31. The MA1 memory column 22 is coupled to the A register 12 of the PPM via an A-bus 32. The MB1 column 23 is coupled to B register 13 via a B-bus 33. Similarly, the MP2, MA2 and MB2 columns 121, 122 and 123 are coupled to the P, A and B registers 111, 112 and 113 of PPM#2 via buses 131, 132 and 133; the MP3, MA3 and MB3 columns 221, 222, 223 are coupled to the P, A and B registers 211, 212 and 213 of PPM#3 via buses 231, 232 and 233, and the MP4, MA4 and MB4 columns 321, 322, 323 are coupled to the P, A and B registers 311, 312, 313 of PPM#4 via buses 331, 332 and 333, respectively.

In addition to the P, A and B buses which couple the memory columns to the PPM registers, the system also includes three segmented lateral transfer buses 40, 50 and 60 which permit transfer of data between PPM's while in the execute mode. All of the buses transfer 8 bit bytes in parallel. An electronic 8-pole switch 41 is used to couple P-bus 31 to lateral transfer bus 40 when the switch is activated. Similarly, switches 51 and 61 couple P-bus 31 to lateral transfer buses 50 and 60, switches 42, 52 and 62 couple A-bus 32 to lateral transfer buses 40, 50 and 60 and switches 43, 53 and 63 couple B-bus 33 to lateral transfer buses 40, 50 and 60, respectively.

Similarly, switches 141-143, 151-153 and 161-163 can couple PPM#2 to the lateral transfer buses, switches 241-243, 251-253 and 261-263 can couple PPM#3 to the lateral transfer buses, and switches 341-343, 351-353 and 361-363 can couple PPM#4 to the lateral transfer buses.

Interrupt switch 44 is located to normally interrupt lateral transfer bus 40 between switches 43 and 141, but to connect the segments of the bus where activated. Similarly, interrupt switches 54 and 64 are located to interrupt buses 50 and 60 below switches 53 and 63, respectively. Likewise interrupt switches 144, 154 and 164 interrupt the lateral transfer buses below switches 143, 153 and 163, interrupt switches 244, 254 and 264 interrupt the buses below switches 243, 253 and 263, and interrupt switches 344, 354 and 364 interrupt the buses below switches 343, 353 and 363. The interrupt switches are located along the lateral transfer buses between adjacent PPM's and, thus, the lateral transfer buses can be segmented as desired to form separated buses spanning a desired number of PPM's.

Lateral switch control (LSC) circuit 34 is coupled to receive data from the MT1 column 24 of the memory. Control circuit 34 decodes the data and controls switches 41-44, 51-54 and 61-64 accordingly. Preferably the control data is in the form of an 8 bit byte with 3 bits reserved for controlling interrupt switches 44, 54 and 64. Since many switch combinations are prohibited (e.g. connection of the A-bus to more than one of the lateral transfer buses or connection of the same lateral transfer bus to more than one register of a PPM), the other five bits are adequate to control the nine remaining switches. A suitable code for these switches is set forth in Table I.

TABLE I

LATERAL SWITCH CONTROL (LSC) CODE

| LINE # | \multicolumn{5}{c}{CODE BITS – Bus Switches} | | | | Interrupts | | | \multicolumn{3}{c}{SWITCHES – P-Bus} | | | \multicolumn{3}{c}{A-Bus} | | | \multicolumn{3}{c}{B-Bus} | | | Interrupts | | |
|---|---|---|---|---|---|---|---|---|---|---|---|---|---|---|---|---|---|---|---|---|
|  | 1 | 2 | 3 | 4 | 5 | 6 | 7 | 8 | 41 | 51 | 61 | 42 | 52 | 62 | 43 | 53 | 63 | 44 | 54 | 64 |
| 0  | 0 | 0 | 0 | 0 | 0 | — | — | — | X |   |   |   |   |   |   |   |   |   |   |   |
| 1  | 0 | 0 | 0 | 0 | 1 | — | — | — |   | X |   |   |   |   |   |   |   |   |   |   |
| 2  | 0 | 0 | 0 | 1 | 0 | — | — | — |   |   | X |   |   |   |   |   |   |   |   |   |
| 3  | 0 | 0 | 0 | 1 | 1 | — | — | — |   |   |   | X |   |   |   |   |   |   |   |   |
| 4  | 0 | 0 | 1 | 0 | 0 | — | — | — |   |   |   |   | X |   |   |   |   |   |   |   |
| 5  | 0 | 0 | 1 | 0 | 1 | — | — | — |   |   |   |   |   | X |   |   |   |   |   |   |
| 6  | 0 | 0 | 1 | 1 | 0 | — | — | — |   |   |   |   |   |   | X |   |   |   |   |   |
| 7  | 0 | 0 | 1 | 1 | 1 | — | — | — |   |   |   |   |   |   |   | X |   |   |   |   |
| 8  | 0 | 1 | 0 | 0 | 0 | — | — | — |   |   |   |   |   |   |   |   | X |   |   |   |
| 9  | 0 | 1 | 0 | 0 | 1 | — | — | — | X |   |   |   | X |   |   |   |   |   |   |   |
| 10 | 0 | 1 | 0 | 1 | 0 | — | — | — | X |   |   |   |   | X |   |   |   |   |   |   |
| 11 | 0 | 1 | 0 | 1 | 1 | — | — | — | X |   |   |   |   |   |   | X |   |   |   |   |
| 12 | 0 | 1 | 1 | 0 | 0 | — | — | — | X |   |   |   |   |   |   |   | X |   |   |   |
| 13 | 0 | 1 | 1 | 0 | 1 | — | — | — |   | X |   | X |   |   |   |   |   |   |   |   |
| 14 | 0 | 1 | 1 | 1 | 0 | — | — | — |   | X |   |   |   | X |   |   |   |   |   |   |
| 15 | 0 | 1 | 1 | 1 | 1 | — | — | — |   | X |   |   |   |   | X |   |   |   |   |   |
| 16 | 1 | 0 | 0 | 0 | 0 | — | — | — |   | X |   |   |   |   |   | X |   |   |   |   |
| 17 | 1 | 0 | 0 | 0 | 1 | — | — | — |   |   | X | X |   |   |   |   |   |   |   |   |
| 18 | 1 | 0 | 0 | 1 | 0 | — | — | — |   |   | X |   | X |   |   |   |   |   |   |   |
| 19 | 1 | 0 | 0 | 1 | 1 | — | — | — |   |   | X |   |   |   | X |   |   |   |   |   |
| 20 | 1 | 0 | 1 | 0 | 0 | — | — | — |   |   | X |   |   |   |   | X |   |   |   |   |
| 21 | 1 | 0 | 1 | 0 | 1 | — | — | — |   |   |   | X |   |   |   | X |   |   |   |   |
| 22 | 1 | 0 | 1 | 1 | 0 | — | — | — |   |   |   | X |   |   |   |   | X |   |   |   |
| 23 | 1 | 0 | 1 | 1 | 1 | — | — | — |   |   |   |   | X | X |   |   |   |   |   |   |
| 24 | 1 | 1 | 0 | 0 | 0 | — | — | — |   |   |   |   | X |   |   |   | X |   |   |   |
| 25 | 1 | 1 | 0 | 0 | 1 | — | — | — |   |   |   |   |   | X | X |   |   |   |   |   |
| 26 | 1 | 1 | 0 | 1 | 0 | — | — | — | X |   |   |   | X |   |   |   | X |   |   |   |
| 27 | 1 | 1 | 0 | 1 | 1 | — | — | — | X |   |   |   |   |   | X | X |   |   |   |   |
| 28 | 1 | 1 | 1 | 0 | 0 | — | — | — |   | X |   | X |   |   |   |   | X |   |   |   |
| 29 | 1 | 1 | 1 | 0 | 1 | — | — | — |   | X |   |   |   |   | X | X |   |   |   |   |
| 30 | 1 | 1 | 1 | 1 | 0 | — | — | — |   |   | X | X |   |   |   | X |   |   |   |   |
| 31 | 1 | 1 | 1 | 1 | 1 | — | — | — |   |   | X |   | X |   | X |   |   |   |   |   |
| A  | — | — | — | — | — | 0 | 0 | 0 |   |   |   |   |   |   |   |   |   |   |   |   |
| B  | — | — | — | — | — | X | 0 | 0 |   |   |   |   |   |   |   |   |   | X |   |   |
| C  | — | — | — | — | — | 0 | X | 0 |   |   |   |   |   |   |   |   |   |   | X |   |
| D  | — | — | — | — | — | 0 | 0 | X |   |   |   |   |   |   |   |   |   |   |   | X |

With the code in Table I, if lateral switch control circuit 34 receives an instruction byte "01001000" (lines 9 and A in Table I), then during the execute mode switch 41 is activated connecting bus 31 and P register 11 to lateral bus 40, switch 52 is activated connecting bus 32 and A register 12 to lateral bus 50, and interrupt switches 44, 54 and 64 are not activated and therefore disconnect buses 40, 50 and 60 below switches 43, 53 and 63. As another example, if lateral switch control circuit 34 receives an instruction byte "10101110" (lines 21, B and C), then during the execute mode switch 42 is activated connecting bus 32 and A register 12 to lateral bus 50, switch 53 is activated to connect bus 33 and B register 13 to lateral bus 50, and interrupt switches 44 and 54 are activated completing the connection of lateral buses 40 and 50 below PPM#1.

Lateral switch control (LSC) circuits 134, 234 and 334 similarly receive control data from the MT2, MT3 and MT4 memory columns 124, 224 and 324, respectively. Switch control 134 controls switches 141–144, 151–154 and 161–164 associated with PPM#2 module 100, switch control 234 controls switches 241–244, 251–254 and 261–264 associated with PPM#3 module 200 and switch control 334 controls switches 341–344, 351–354 and 361–364 associated with PPM#4 module 300. Additional PPM modules are similarly coupled to the lateral transfer buses through associated switches and lateral switch controls. The lateral transfer buses emerging after the last PPM are connected back to the beginning above switches 41, 51 and 61.

Sequencing of the computer operation is achieved using a program sequencer 380 which receives clock pulses from a clock 382. The sequencer provides for three basic operating modes which are "MI" for transfer of memory into the PPM's, "X" for execute, and "MO" for data transfer out of the PPM back to memory. Modes MI and X are required in the sequence whereas MO is optional. The computer mode is indicated by a signal on the appropriate one of lines 395–397 which couple the program sequencer to the PPM's. In addition, line 396 is also connected to the lateral switch control circuits for activation of the selected switches during the "X" execute mode.

The program sequencer addresses memory 20, row at a time, via memory address bus 386. The M-SEQ memory column 383 is coupled to the program sequencer to provide control data from memory. The program sequencer is also coupled to lateral transfer buses 50 and 60 via buses 390 and 392 and receives comparison signals via line 394.

Normally the program sequencer advances one row of memory on each operating cycle. The row address can jump to any other address and the jump can be absolute or conditional. Return of data from the PPM's to memory 20 in the "MO" mode can be to the same row used in the "MI" mode or can be offset therefrom. Offsets in the "MO" mode can also be absolute or conditional. The data byte transferred from M-SEQ column to the program sequencer during the MI mode is decoded and determines the offset, if any, during the following MO mode and the jump, if any, during the following MI mode. Conditional jumps or offsets are in accord with the signal appearing on "C" line 394.

In the system illustrated in the preferred embodiment data and instructions are transferred to the PPM's in the "MI" mode row at a time using a single memory row address. Where desired, however, multiple addresses can be employed so that, for example, instructions may come from one address in memory whereas data may come from a different address in memory.

The C line 394 originates from the comparison logic circuits 14, 114, 214, 314 in the PPM's. The comparison logic circuits are also interconnected into a serial chain by connections 387-390. The comparison logic is described in more detail hereinafter in connection with FIG. 4.

The Program Sequencer

Figure 2:
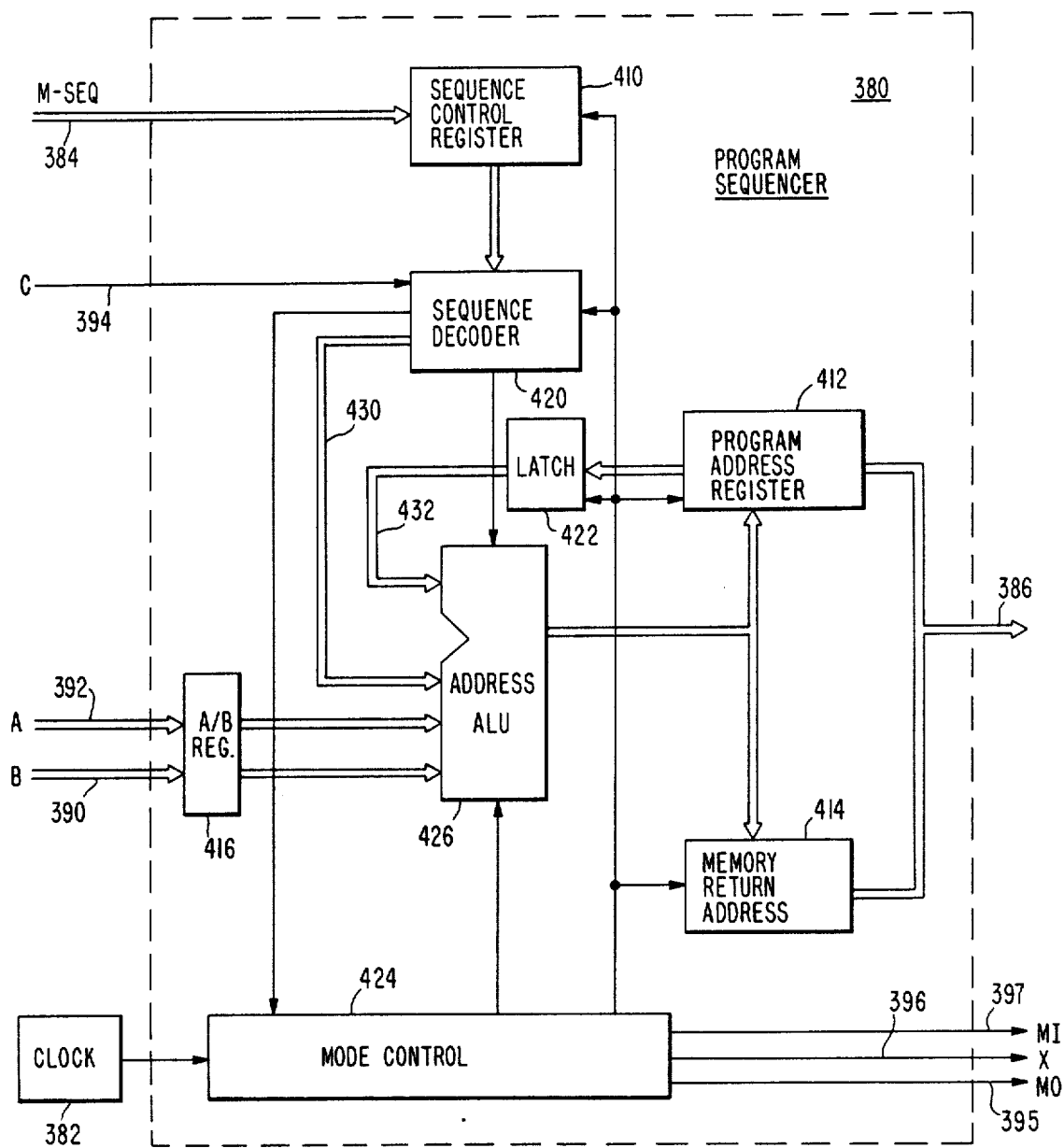
FIG. 2 is a schematic block diagram of the program sequencer for the system.

The program sequencer is illustrated in more detail in FIG. 2. A sequence control register 410 receives control data from the M-SEQ column of memory via bus 384 and a 16 bit A/B register 416 receives data from the lateral transfer buses via buses 390 and 392. A program address register 412 holds the memory address used during the MI mode where data is transferred from memory to the PPM's. A memory return address register 414 holds the memory address used during the MO mode where data is transferred from the PPM's to memory. Either register 412 or register 414 is coupled to memory address bus 386 depending on the operating mode.

The addresses are computed by an Address ALU (arithmetic logic unit). The Address ALU receives the current program address from register 412 via a latch 422 and input bus 432. The address ALU also receives data indicating the magnitude of any jump or offset either from decoder 420 via bus 430 or from A/B register 416. Using the current address appearing at the output of latch 422, the ALU adds the "jump" or "offset" to calculate a new address which is stored either in program address register 412 or in memory return address register 414.

The control data stored in sequence control register 410 is supplied to sequence decoder 420. A suitable 4 bit code for controlling the various functions of the program sequencer is set forth in Table II below.

430. In most cases the magnitude of a jump or offset is relatively small and the 4 data bits from decoder 420 are adequate. For large jumps or offsets, however, 16 bits of data in A/B register 416 can be used.

For determining the next program address, the code in Table II indicates whether the address is to jump (JMP) to another address, or whether the jump is conditional (COND). The magnitude of the jump can be incremental (INC) i.e., advanced one row, or can be any larger number of steps as determined by the decoder 420 from the addressing control code bits (code) or from the 16-bit A/B register 416 (PPM). For the memory return address the code indicates whether or not a memory out "MO" mode is required (YES or NO), and, if so, whether the offset is conditional (COND). If the addressing control bits are not used for determining the program address, they can be used for determining the return offset address (CODE). Otherwise, the return address can be determined using the value in A/B register 416 (PPM).

Mode control circuit 424 receives clock pulses from clock 382 and progresses in a three step sequence MI, X, MO. Steps corresponding to the modes MI and X are required whereas MO is optional as determined by the sequence decoder 420. Mode control circuit 424 controls the operating modes of registers 410, 412 and 414 as well as decoder 420, ALU 426 and latch 422.

The program sequencer is initialized by setting program address register 412 to the address corresponding to the first row of memory. Thereafter upon occurrence of the next clock pulse mode control 424 goes to the MI mode and transfers the first row of memory into the PPM's and transfers the first row from the M-SEQ column of memory into sequence control register 410. During the following X (execute) mode, if the control data indicates no memory return (Table II lines 0, 4, 10 or 14), then the ALU calculates the next program address and stores the result in program address register 412. On the other hand, if the control data indicates a memory return, then the ALU calculates the memory return address and stores the result in memory return address register 414 during the X mode and thereafter calculates the next program address during the MO mode. In calculating program addresses, the current address in latch 422 is used as the base and the new

TABLE II

| LINE # | BINARY | | | | PROGRAM SEQUENCER CODE | | | | | | | |
|---|---|---|---|---|---|---|---|---|---|---|---|---|
| | | | | | PROGRAM ADDRESS | | | | MEMORY RETURN ADDRESS | | | |
| | | | | | JMP | COND | PPM | CODE | INC | YES | NO | COND | PPM | CODE |
| 0 | 0 | 0 | 0 | 0 | X | | | X | | X | | | |
| 1 | 0 | 0 | 0 | 1 | X | | | | X | X | | X | | X |
| 2 | 0 | 0 | 1 | 0 | X | | | | X | X | | | | X |
| 3 | 0 | 0 | 1 | 1 | X | | | X | | X | | X | X | |
| 4 | 0 | 1 | 0 | 0 | | X | | X | | | X | | |
| 5 | 0 | 1 | 0 | 1 | | X | | | X | X | | X | | X |
| 6 | 0 | 1 | 1 | 0 | | X | | | X | X | | | | X |
| 7 | 0 | 1 | 1 | 1 | | X | | X | | X | | X | X | |
| 8 | 1 | 0 | 0 | 0 | X | X | | | | X | | | | X |
| 9 | 1 | 0 | 0 | 1 | X | X | | | | X | | X | | X |
| 10 | 1 | 0 | 1 | 0 | X | X | | | | | X | | |
| 11 | 1 | 0 | 1 | 1 | X | | | | X | X | | X | | |
| 12 | 1 | 1 | 0 | 0 | | X | X | | | X | | | | X |
| 13 | 1 | 1 | 0 | 1 | | X | X | | | X | | X | | X |
| 14 | 1 | 1 | 1 | 0 | | X | X | | | | X | | |
| 15 | 1 | 1 | 1 | 1 | | X | | | X | X | | X | X | |

Since the control code only requires 4 bits, the remaining bits in the sequence control register can be used as data bits determining the magnitude of "jumps" and "offsets". The data bits are passed to the ALU via bus address calculated by adding the "jump" value derived either from the decoder 420 or A/B register 416. Memory return addresses are similarly determined by using the current program address as a base and adding the "offset" value which may come from either decoder 420 or the A/B register.

The Parallel Processing Module (PPM)

The parallel processing module (PPM) layout is shown in FIG. 3 and is preferably a microprocessor on a single chip (large scale integrated circuit). Signals are transferred to and from the processing module 400 via three 8-bit parallel buses referred to as the P-Bus 102 for program instructions and the A-Bus 104 and B-Bus 106 for data.

The central component of the processing module is the arithmetic logic unit (ALU) 410 which is of a conventional combinatorial logic design of a type commonly found in microprocessors. Input data for the ALU is received via an A-in bus 412 and a B-in bus 414. Output data from the ALU is supplied to an A-out bus 416 and a B-out bus 418. The ALU is designed to perform addition, subtraction, AND, OR, exclusive OR, and comparisons with respect to two 8-bit bytes received via the A-in and B-in buses and provides the output on the A-out or B-out buses in 8-bit or 16-bit format. In addition, the ALU is designed to perform the single word operations like increment, document, rotate, complement, and passthrough. The single word operations can be performed on either a single 8-bit byte from either the A-in bus or the B-in bus or can be performed on a 16-bit word from the A-in bus and the B-in bus. The ALU outputs can be either in 8-bit format on either the A-out bus or the B-out bus, or can be in 16 bit format appearing on the A-out bus and the B-out bus. The outputs from the ALU pass through a crossover switch 420 which, when activated, cause the output normally appearing on the A-out bus to, instead, appear on the B-out bus while the output normally appearing on the B-out bus appears on the A-out bus.

A-out bus 416 and A-in bus 412 are coupled to the external A-bus 104 via the A data bus buffer 430 which is an 8 bit bidirectional 3-state buffer used to isolate the internal data busses from the external data bus. During the input mode data from the external bus 104 is transferred to the internal A-in bus 412. During the output mode, the content of internal A-out bus 416 drives the data bus output buffers. The output buffers are switched off during input or nontransfer operations. B-out bus 418 and B-in bus 414 are similarly coupled to the external B data bus 106 via the B data bus buffer 440.

The processing module includes four internal registers referred to as registers A to D and designated 432, 442, 436 and 446, respectively. Each of the data registers include an associated output latch, the latches being 434, 444, 438 and 448, respectively. Data in a register can be transferred to the output latch which then maintains the data output while the register is free to accept new data. With the register/latch arrangements, any of the registers can be used as accumulators where the latch provides the driving signals to the ALU input while the resulting ALU output signals are stored in the associated register.

The A register 432 can receive data from either the A-in bus 412 or the A-out bus 416. C register 436 can receive data from the A-out bus 416. The A latch 434 can supply data to either A-in bus 412 or A-out bus 416 whereas C latch 438 can supply data to A-in bus 412. Similarly B register 442 can receive data from either the B-in bus 414 or the B-out bus 418. D register 446 can receive data from the B-out bus 418. The B latch can supply data to B-in bus 414 or to B-out bus 418 whereas D latch 448 can supply data to B-in bus 414. With this arrangement, as will be explained in more detail hereinafter, data can be transferred from the main memory to the A and B registers via external A bus 104 and B bus 106 and the associated buffers 430 and 440. Data can be transferred from the processing module back to the main memory from A latch 434 via buffer 430 and external bus 104 and from B latch 444 via buffer 440 and external bus 106. During execute operations the ALU can receive input data via A-in bus 412 from either the external bus 104, A latch 434 or C latch 438. Similarly, the ALU can also receive data via the B-in bus 414 from external bus 106, B latch 444 or D latch 448. The AU output can be supplied to C register 436, A register 432 or external bus 104 via A-out bus 416 and/or can be supplied to D register 446, B register 442 or external bus 106 via B-out bus 418.

Instructions for the processing module are received via a P-bus 102 which transfers 8-bit instructions to a P register 452 which, in turn maintains the instruction at the input of instruction decode circuit 454. The decode circuit is connected to control operation of ALU 410 and also sends a signal to internal transfer control circuit 458. Transfer control circuit 458 also receives three signals from outside the processing module via an MI (memory in) line 455, a X (execute) line 456 and a MO (memory out) line 457. During the MI mode of operation, as indicated by a signal on line 455, buffers 430 and 440 and registers 432 and 442 are controlled by transfer control circuit 458 so that data is transferred from external bus 104 through buffer 430 to A register 432 and data is transferred from external bus 106 through buffer 440 to B register 442. During the MO mode of operation as indicated by a signal on line 457, buffers 430 and 440 and latches 434 and 444 are controlled so that data is transferred from A latch 434 to external bus 104 via buffer 430 and data is transferred from B latch 444 to external bus 106 via buffer 440. During the execute (X) mode of operation, as indicated by a signal on line 456, transfer control circuit 458 operates under control of instruction decode circuit 454 which decodes the program instruction and indicates the selected inputs and outputs for ALU 410 during the execution mode.

In the preferred embodiment an 8-bit operation code (op code) length has been selected. Longer or shorter code lengths can be used. Longer operating codes provide greater flexibility and more ALU control choice whereas shorter operating codes have fewer hardware requirements. A suitable 8-bit code is set forth in Table III wherein 4 bits [first op code hexidecimal bit] are used to select the desired ALU operation (Table IIIA) and the remaining 4 bits [second hexidecimal op code bit] are used to select the data transfer configuration of the processing module (Table IIIB).

TABLE IIIA

| | ALU CODE | |
|---|---|---|
| Hex Code | Binary | Function |
| 0 | 0000 | Add |
| 1 | 0001 | Add if C=1 |
| 2 | 0010 | Subtact |
| 3 | 0011 | AND |
| 4 | 0100 | OR |
| 5 | 0101 | Exclusive OR |
| 6 | 0110 | NOR |
| 7 | 0111 | Compare zero |
| 8 | 1000 | Compare P/M |
| 9 | 1001 | String Comparison |
| A | 1010 | Increment |

TABLE IIIA-continued

| | ALU CODE | |
|---|---|---|
| Hex Code | Binary | Function |
| B | 1011 | Decrement |
| C | 1100 | Rotate Right |
| D | 1101 | Rotate Left |
| E | 1110 | Compliment |
| F | 1111 | Pass Thru |

TABLE IIIB

| | | PPM DATA TRANSFER CONFIGURATION | | | | | | | | | | | |
|---|---|---|---|---|---|---|---|---|---|---|---|---|---|
| | | INPUT | | | | | | OUTPUT | | | | | |
| Hex Code | Binary | A | B | C | D | ABus | BBus | A | B | C | D | ABus | BBus | Cross |
| 0 | 0000 | X | X | | | | | X | X | | | X | X | |
| 1 | 0001 | X | X | | | | | | | X | X | X | X | |
| 2 | 0010 | X | X | | | | | X | | X | X | X | X | X |
| 3 | 0011 | X | X | | | | | | X | X | | X | X | |
| 4 | 0100 | | | X | X | | | X | X | | | X | X | |
| 5 | 0101 | | | X | X | | | | | X | X | X | X | |
| 6 | 0110 | | | X | X | | | X | | X | X | X | X | |
| 7 | 0111 | | | X | X | | | | X | X | | X | X | |
| 8 | 1000 | R | R | | | X | X | | | X | X | | | |
| 9 | 1001 | | X | | | X | | X | X | | | | X | |
| A | 1010 | | | X | X | | | X | X | | X̲ | | X | X |
| B | 1011 | X | | | | | X | X | X | X | X | X | | |
| C | 1100 | | X | | | | X | X | X | X | X | X | | X |
| D | 1101 | X | | X | | | | X | X | | X̲ | X | X | X |
| E | 1110 | X | | | X | | | | | X | X | X | X | |
| F | 1111 | | X | X | | | | X | X | | | X | X | |

For example, op code 2D [hex 2 from Table IIIA and hex D from table IIIB] would instruct the ALU to subtract the numbers appearing on A-in and B-in buses, the A and D latches are switched to provide the inputs and the ALU outputs are to be crossed and supplied to registers A, B and D as well as the external A-bus and B-bus. As another example, op code B0 instructs the ALU to decrement the data appearing at the inputs, that the inputs are to be supplied by the A and B latches, and that the decremented outputs should be supplied to the A and B registers and to the A-bus and the B-bus.

The op codes in Table III provide considerable data routing flexibility. Data can be transferred from memory into the processing module A and B registers, processed through the ALU, and the results supplied to the A and B registers for return to the main memory or can be returned to the C and D registers for later use in the processing module. Instead of using data from the main memory as the ALU input, the inputs can instead be taken from the C and D registers where data was stored in a prior operation. Furthermore, and of particular significance, the ALU input can be derived directly from the external bus and the ALU result can also be supplied directly to an external bus. Since the ALU can be coupled to the external buses it becomes possible, as will be explained hereinafter in more detail, to chain the ALU's of different processing modules so that the output of one ALU becomes the input of another ALU. Chaining of the ALU's in this fashion permits concurrent tandem operation on a serial sequence of program steps.

ALU 410 also supplies signals to flag flip-flops 460 which, in turn, are coupled to a comparison logic circuit 462. The comparison logic circuit is connected to external lines 463-465 designated "U", "D" and "T", and is also connected to crossover switch 420. A control signal for logic circuit 462 is also received from instruction decode circuit 454. The condition flags are set during certain op code operations of the ALU. The flag conditions can vary according to design but normally will include at least "zero", "sign" and "carry" flags. Thus, for example, a comparison of two numbers would set the "zero" flag to "0" if the numbers are the same or to "1" if the numbers are different. The same comparison would set the "sign" flag if the numbers are different indicating which number is larger. The "carry" flag is used in addition, subtraction and rotation operations to indicate a carry.

The operation performed by comparison logic circuit 462 is determined by the program instruction as decoded in decode circuit 454. For example, in a comparison of two numbers which set the "zero" and "sign" flags, logic circuit 462 may activate the crossover switch 420 to interchange the numbers between the A and B registers. The flag signal may go to the main program sequencer via the "C" line 465 to control conditional program jumps or data offsets. The comparison logic may chain the comparisons with other PPM's using the "U" and "D" lines 463 and 464. Chained comparisons will be described hereinafter in more detail.

The Comparison Logic Circuits

Some computer operations are generally regarded as being sequential and therefore not suitable for parallel processing. For example, in the comparison of two multi-digit numbers, the numbers are usually compared a digit at a time starting with the highest order digit. When a digit comparison indicates the digits are the same, the program advances to the next lower pair of digits. When a digit comparison indicates the digits are different, the program looks at the sign (+ or −) of the comparison to determine which number is larger and then either leaves the numbers at the locations found (if in the desired order) or transposes their locations (if not in the desired order). In such operations, since the controlling digit pair location is not known in advance, the operation is performed sequentially to find the highest order mismatch. In accordance with the invention, however, such operations can be performed in parallel with additional hardware as shown in FIG. 4.

Figure 4:
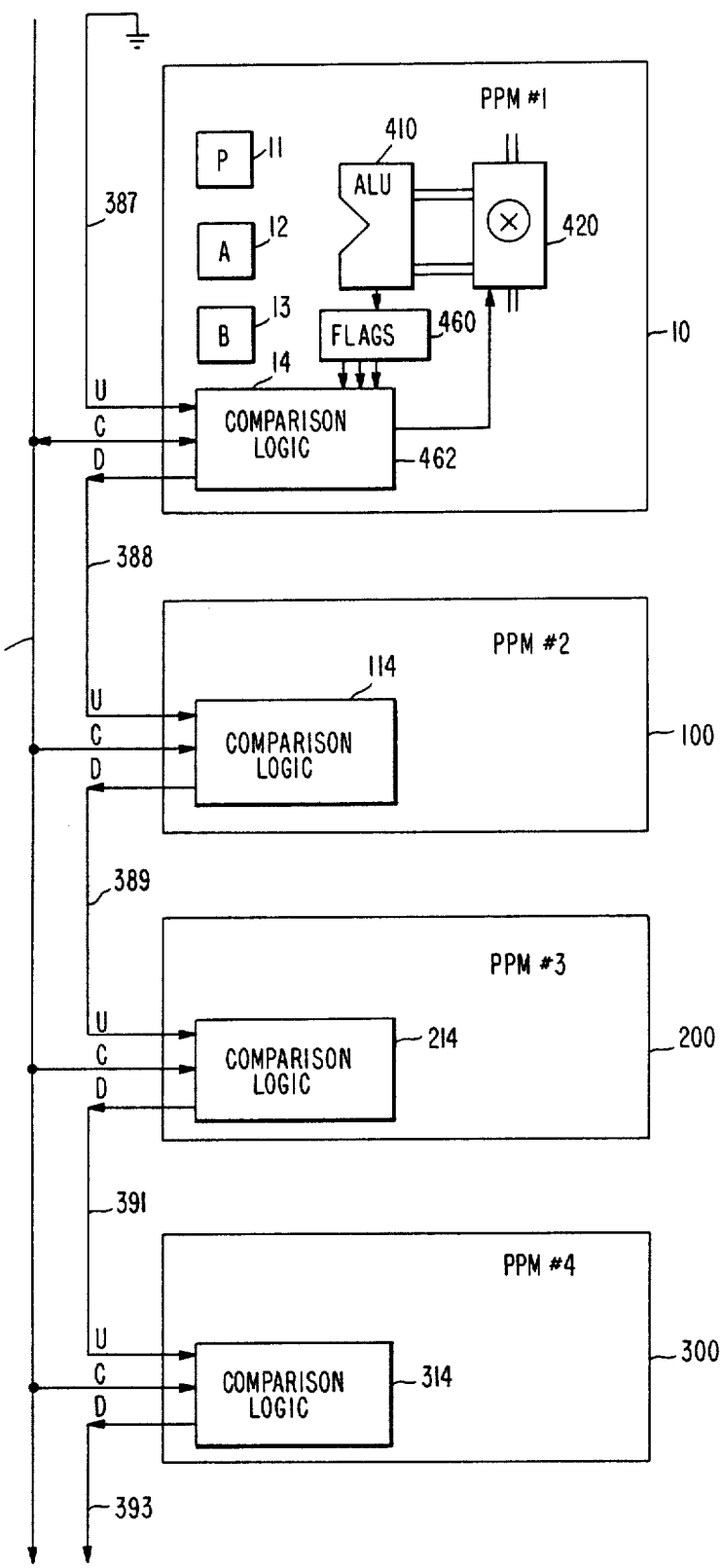
FIG. 4 is a schematic block diagram of the comparison logic interconnected between several PPM's.

FIG. 4 is a schematic diagram illustrating the pertinent portions of the comparison circuitry. The first PPM 10 (FIG. 1) including registers 11-13 and comparison logic circuit 14 is shown in FIG. 4 together with some details of the PPM (FIG. 3) including ALU 410, flag registers 460, comparison logic circuit 462 and crossover switch 420 (FIG. 3). Additional PPM units 100, 200 and 300 are shown including comparison logic circuits 114, 214 and 314, respectively. Although not shown in FIG. 4, all the PPM's are the same as illustrated in FIG. 3 and, hence, similarly would include details as shown for PPM 10 in FIG. 4.

The comparison logic circuits 14, 114, 214 and 314 each have three external connections designated "C", "U" and "D". The "C" (comparison) connection of each of the comparison logic circuits is connected to the C Bus 394. The "U" and "D" (up and down) connections interconnect the individual comparison logic circuits into a serial chain. Thus, the D output of comparison logic circuit 14 is connected to the U input of comparison logic circuit 114 via line 388, the D output of comparison logic circuit 114 is connected to the U input of comparison logic circuit 214 via line 389, and the D output of comparison logic circuit 214 is connected to the next comparison logic circuit via line 391 which in turn is connected to the next via line 393. The U input of the first comparison logic circuit 14 in the chain is connected to ground ("0") via line 387.

The logic for the comparison logic circuit is as set forth in Table IV below:

TABLE IV

| U | Fo | F+ | :: | D | C |
|---|----|----|----|----|----|
| 1 | X | X | :: | 1 | — |
| 0 | 0 | 0 | :: | 0 | — |
| 0 | 1 | 0 | :: | 1 | 0 |
| 0 | 1 | 1 | :: | 1 | 1 |

Fo
0 = comparison zero
1 = comparison net zero
F+
0 = comparison negative
1 = comparison positive
Chain (U or D)
0 = no mismatch
1 = mismatch found
C - Bus
0 = correct
1 = inverted order If the U input is "1", indicating a mismatch has been found further up the chain, the D output becomes "1" regardless of the flag status. If the U input is "1", indicating a mismatch has not been found when comparing the higher order digits, the flag status is examined. If both flags are "0", indicating the digits examined at the PPM are the same, the D output becomes "0". If a mismatch is found at the PPM (Fo=1) then the D output becomes "1" and the C bus is set at either "0" or "1" depending on the sign of the mismatch.

When the comparison is completed, those of lines 387-393 above the mismatch show a "0" whereas those below the mismatch show a "1" to disable the associated logic circuits so they have no effect upon the status of the C-bus 394. The status of the C-bus is determined by the highest order mismatch (i.e., where U=0 and Fo=1).

The connection of comparison logic circuit 462 to crossover switch 420, and similar connections in the other PPM's, permits interchanging the digit locations if the numbers are in the wrong order. For example, assume the digits of one number are initially in the A registers and the digits of the other number being compared are in the B registers. If the numbers are in the correct order (C=0), the digits are passed through switch 420 back to their original register and, hence, the numbers do not change position. On the other hand, if the numbers are not in the correct order (C=1), then the crossover switches are activated to interchange the digits so that the number initially in the A registers ends up in the B registers, and vice versa.

Thus, in a single parallel operation the numbers are compared and exchanged if in the wrong order. The chain interconnection and common C-bus connection can, in general, be used where a flag condition at an unknown one of the PPM's controls operation at several of the PPM's or at the program sequencer.

Co-Logic Processor Programing

Many problems to be solved by computer are basically parallel problems and can easily be programmed according to this invention with a separate PPM or group of PPM's, being assigned to the parallel branches of the problem. For example, graphics systems are common where screens are created by calculating the values (usually intensity and/or color) for the individual pixels of a picture matrix. A separate PPM could be assigned for each pixel and the values for the pixels then calculated very rapidly in parallel.

Programs that are not parallel in nature normally contain parallel branches, i.e., program sections or operations that can be performed in parallel at the same time since they do not depend on unavailable data. For example, at the machine language level most programs consist largely of "move" (mnemonic code MOV) instructions which move data between memory, CPU and various registers in preparation for the execution of ALU operations. Although normally programmed sequentially because of constraints imposed by the Van Neumann architecture of most computers, these are usually parallel operations that could be performed simultaneously by separate PPM's according to the invention. Another example of parallel operations which are performed sequentially because of the Van Neumann architecture is in video screen control. In a typical configuration the screen display is refreshed by reading a dedicated memory section in synchronism with the video raster scan and controlling display intensity accordingly. A block of text is displayed by sequentially, character at a time, placing code in the dedicated memory section. With the invention, the entire block of text, or an entire screen, could be moved to the dedicated screen memory simultaneously using PPM's operating in parallel.

In accordance with this invention, the use of parallel PPM's is not limited to parallel program sections since it can also be used with program sections that are inherently sequential. Sequential program operations are those which cannot be performed until the results are available from a prior operation in the program sequence. Through the use of the lateral transfer buses 40, 50 and 60 (FIG. 1) and the internal switching capability of the PPM (FIG. 3), the system according to this invention can be dynamically configured to perform sequential operations. The output of one ALU can be coupled to the input of one or more other ALU's for tandem operation to thereby carry out multiple sequential program operations during a single operating step.

FIG. 5 is a simple illustration showing how dynamic configuration can be used according to the invention for integer multiplication of four digit binary numbers. Assume the multiplicand is eleven, the multiplier is five and the product, of course, is fifty-five. In binary form this would be 1011×0101=110111.

As shown in FIG. 5A the multiplication can be achieved by placing the multiplicand in row (1) and successively shifting left to form rows (2), (3) and (4).

Since the second and fourth least significant digits of the multiplier 0101 are zero, rows (2) and (4) are deleted and the remaining digits, i.e., rows (1) and (3) are added to provide the product 110111.

Figure 5B:
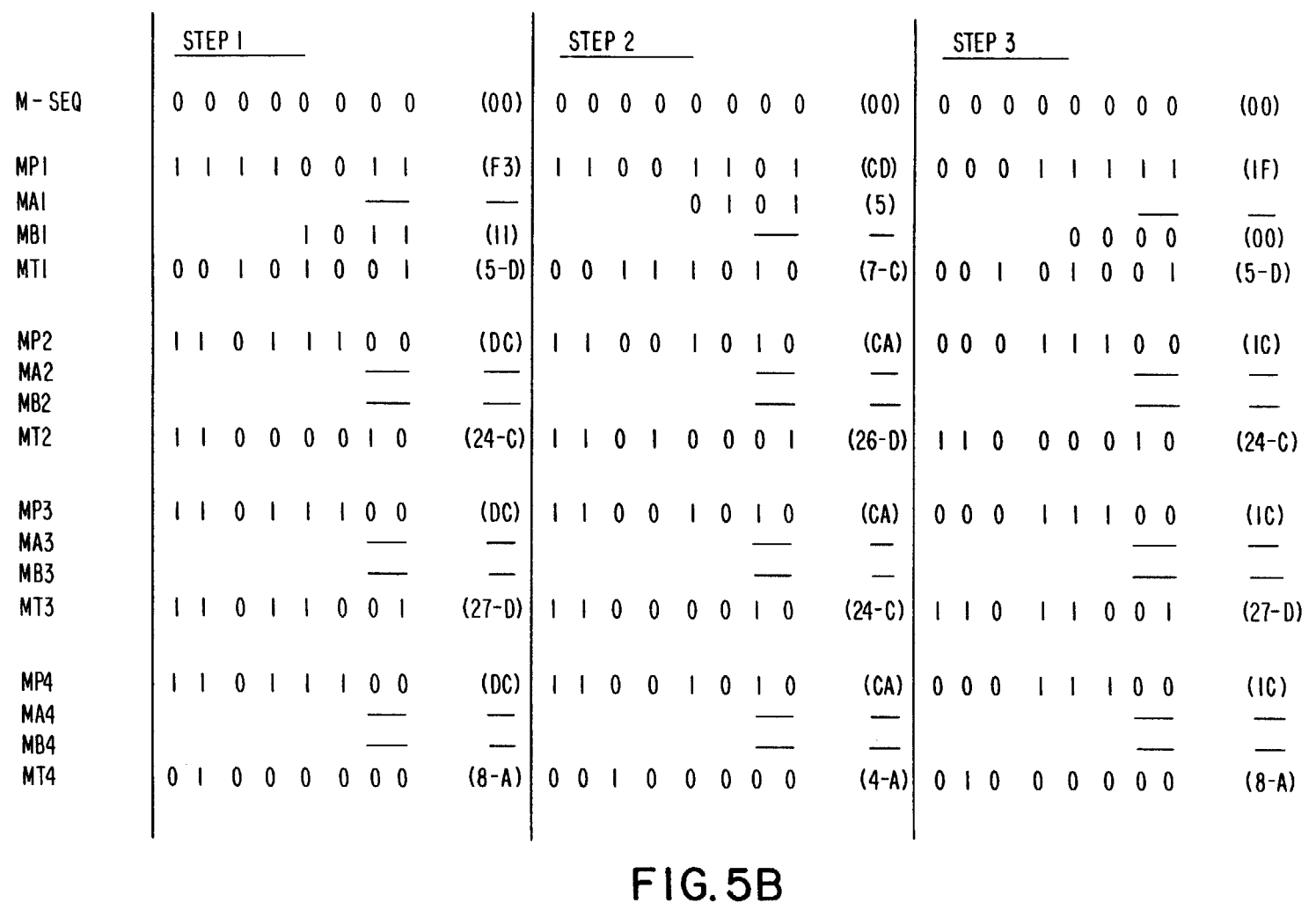

The program for carrying out this multiplication is shown in FIG. 5B and requires three rows of memory (Steps 1, 2 and 3 in FIG. 5B) for the program sequencer and the four PPM's being used. In hexadecimal, using the code in Table III, the program for column MP1 is F3, CD, 1F, for column MP2 is DC, CA, 1C, for column MP3 is DC, CA, 1C and for column MP4 is DC, CA, 1C. The program for the first lateral switch (LSC #1) control MT1 (34 in FIG. 1) is 00101001 (Table I lines 5 and D) which closes switches 62 and 64, 00111010 (Table I lines 7 and C) which closes switches 53 and 54, and 00101001 (Table I lines 5 and D) which closes switches 53 and 54. The program for the second lateral switch control MT2 is 11000010 which closes switches 152, 154 and 163, 11010001 which closes switches 152, 163 and 164 and 11000010 which closes switches 152, 153 and 154. The program for the third lateral control MT3 is 11011001 which closes switches 253, 262 and 264, 11000010 which closes switches 253, 254 and 262 and 11011001 which closes switches 253, 262 and 264. The program for the fourth lateral switch control MT4 is 01000000 which closes switch 363, 00100000 which closes switch 352 and 01000000 which closes switch 363. The program for program sequencer (FIG. 2) is 00, 00, 00 meaning that the sequence progresses one row at a time without any MO modes in the sequence for transferring data out of the PPM's. The multiplicand (binary 1011) is placed in column MB1, row 1, the multiplier (binary 0101) is placed in column MA1, row 2, and a 0000 is placed in column MB1, row 3.

In operation, as shown in FIG. 5C, the first row of memory is loaded into the four PPM's and the lateral switch controls (LCM's) in parallel for the first step of the program. The first PPM (PPM#1) receives hexadecimal F3 (table III code for passthrough) in the P register and the multiplicand (1011) in the B register. In the following execute mode the multiplicand passes through to the C register and to the A port. LSC#1 closes switches 62 and 64 and LSC#2 closes switch 163. The multiplicand (1011) at the A port of PPM #1 therefore passes to the B port of PPM#2. PPM#2 is programmed hexadecimal DC to perform a "rotate left" operation and therefore the multiplicand is shifted left one digit (10110) and appears in the C register and at the A port. LCS#2 closes switches 152 and 154 and LCS#3 closes switch 253 and therefore the shifted multiplicand appearing at the A port of PPM#3 passes on to the B port of PPM#3. PPM#3 is also programmed to perform a rotate left operation and therefore the multiplicand shifted left two digits (101100) appears in the C register of PPM#3 and at the A port. LSC#3 closes switches 262 and 264 and LSC#4 closes switch 363 thereby transferring the A port output of PPM#3 to the B port of PPM#4. PPM#4 also carries out a rotate left operation and therefore the multiplicand shifted three digits (1011000) appears in the C register of PPM#4. Thus, upon completion of the first step of the program all of the multiplicand shift operations are performed and the multiplicand is stored in the C registers of PPM#1-PPM#4 shifted left 0, 1, 2 and 3 digits, respectively.

Operations carried out during the second step of the program are illustrated in FIG. 5D. The second row from memory is loaded into the PPM's including the multiplier (0101) loaded into the A register of PPM#1. Each of the PPM's perform a rotate right with carry operation on the multiplier and the LSC's are set to pass the B port output to the A port input of the next PPM. In PPM#1 the shift right operation places "010" in the D register and at the B port and a "1" appears in the carry register. PPM#2 receives "010" and performs a shift right operation to place "01" in the D register and the B port and a "0" in the carry register. PPM#3 receives "01" and performs a shift right operation placing "0" in the D register and the B port and a "1" in the carry register. PPM#4 receives "0" and therefore performs the shift right operation placing a "0" in the carry register. When step 2 is completed, the four digits of the multiplier appear in the carry registers of the PPM's.

The operations carried out in the third step of the program are illustrated in FIG. 5E. The PPM's are programmed to add the B register to the C register if the carry register is "1". The LSC's are set to couple the A port of one PPM to the B port of the next PPM. In executing the operation, the carry register in PPM#1 is "1" and therefore the C register (1011) is added to the B register (0000) and the result appears at the A port and is passed to the next PPM. In PPM#2 the carry register is "0" and therefore no addition is performed and the "1011" is passed on to the next PPM. In PPM#3 the carry register is "1" and therefore the C register (101100) is added to the B register (1011) and the result (110111) appears at the A port and is passed to the next PPM. In PPM#4 the carry register is "0" and therefore the result in the B register (110111) is passed through to the A register without addition. The product of the multiplication therefore appears in the A register of PPM#4.

In this fashion integer multiplication is achieved with PPM's operating in parallel requiring only three program steps which is substantially less than would be required using a computer with the serial Van Neumann architecture. With the Van Neumann architecture expansion to handle larger numbers (e.g. 8 bit or 16 bit integers) substantially increases the number of program steps and the time required for the calculation. In the system according to the invention the larger numbers are handled by increasing the number of PPM's, therefore, requiring no increase in operating steps or time required for calculation.

When multiple PPM's are used to perform sequential operations such as illustrated in FIGS. 5C, 5D and 5E, the time required for the execute mode is somewhat greater than would be required for a single PPM operation since, when the PPM's operate in tandem, adequate time must be provided to permit data to ripple down the line through the PPM's. To minimize the time delay, the PPM as shown in FIG. 3 is preferably arranged so that the ALU output can pass directly to the A-bus and the B-bus without passing through any registers and, likewise, so that data arriving on the A-bus and B-bus can pass directly to the ALU without passing through any registers. If the data to and from the lateral transfer buses does not pass through the registers, the sequential operations can be performed without waiting for one register to set before another PPM can perform its operation. If registers are avoided in the sequential data path, the time required for sequential operations is not significantly greater than that required for a single PPM operation.

While only one illustrative embodiment has been shown in detail, it should be obvious that there are other variations within the scope of the invention. Furthermore, although novel concepts are disclosed for various aspects of the system, all such concepts need not be employed in the system. The invention is more particularly defined in the appended claims.

The invention claimed is:

1. A general purpose parallel digital processor including a plurality of processing modules coupled to a common main memory, the improvement comprising parallel processing modules (PPM's) each including:
   a program register for storing instruction code;
   at least two data registers for storing data to be processed;
   a separate parallel port for each of said registers to permit simultaneous transfer of data and code to said respective registers from the common main memory;
   an arithmetic logic unit (ALU) coupled to receive data from said data registers;
   an instruction decoder
      responsive to said instruction code stored in said program register, and,
      operative to control said ALU to process data from said data registers according to instructions from said program register;
   wherein said main memory is organized in columns and rows and wherein a separate column of memory is associated with each of said ports of said PPM's to permit transfer of the data from the associated columns to said register via said ports.

2. A general purpose parallel digital processor including a plurality of processing modules coupled to a common main memory, the improvement comprising parallel processing modules (PPM's) each including:
   a program register for storing instruction code;
   at least two data registers for storing data to be processed; a separate parallel port for each of said registers to permit simultaneous transfer of data and code to said respective registers from the common main memory;
   an arithmetic logic unit (ALU) coupled to receive data from said data registers;
   an instruction decoder
      responsive to said instruction code stored in said program register, and,
      operative to control said ALU to process data from said data registers according to instructions from said program register;
   a latch associated with each of said data registers to receive data from the respective data register and to drive said ALU while executing instructions; and
   means coupling an output of said ALU to at least one of said data registers.

3. A general purpose parallel digital processor including a plurality of processing modules coupled to a common main memory, the improvement comprising parallel processing modules (PPM's) each including:
   a program register for storing instruction code;
   at least two data registers for storing data to be processed;
   a separate parallel port for each of said registers to permit simultaneous transfer of data and code to said respective registers from the common main memory;
   an arithmetic logic unit (ALU) coupled to receive data from said data registers;
   an instruction decoder
      responsive to said instruction code stored in said program register, and,
      operative to control said ALU to process data from said data registers according to instructions from said program register; and,
   at least one additional data register not associated with a port, said additional register being operative to receive data from said ALU during execution of one instruction and to supply said data to said ALU during an execution of a subsequent instruction.

4. A general purpose parallel digital processor including a plurality of processing modules coupled to a common main memory, the improvement comprising parallel processing modules (PPM'S) including:
   a program register for storing instruction code;
   at least two data registers for storing data to be processed;
   a separate parallel port for each of said registers to permit simultaneous transfer of data and code to said respective registers from the common main memory;
   an arithmetic logic unit (ALU) coupled to receive data from said data registers;
   an instruction decoder
      responsive to said instruction code stored in said program register, and
      operative to control said ALU to process data from said data registers according to instructions from said program register;
   a transfer control circuit operable in at least an input mode and an execute mode, said transfer control circuit being operative
      during said input mode, to transfer data to said registers via said ports from the common main memory, and
      during said execute mode, to transfer data to said ALU via one or more of said ports directly to said ALU, or from one or more of said registers to said ALU;
   the parallel digital processor further including a transfer bus network for selectively interconnecting:
      said PPM's during said execute mode, and said PPM's and the common memory during said input mode.

5. A parallel digital processor according to claim 4 further comprising:
   a main memory organized in columns and rows and wherein a separate column of memory is associated with each of said ports of said PPM's.

6. A parallel digital processor according to claim 4 further comprising:
   at least one additional data register not associated with a port, said additional register being operative to receive data from said ALU during execution of one instruction and to supply said data to said ALU during an execution of a subsequent instruction.

7. A general purpose parallel digital processor including a plurality of processing modules coupled to a common main memory, the improvement comprising parallel processing modules (PPM's) including:
   a program register for storing instruction code; at least two data registers for storing data and code to be processed;
   a separate parallel port for each of said registers to permit simultaneous transfer of data and code to said respective registers from the common main memory;
   an arithmetic logic unit (ALU) coupled to receive data from said data registers;

an instruction decoder
　responsive to said instruction code stored in said program register, and,
　operative to control said ALU to process data from said data registers according to instructions from said program register;
a transfer control circuit operable in at least an input mode, an execute mode and an output mode, said transfer control circuit being operative
　during said input mode, to transfer data to said registers via said ports from the common main memory,
　during said execute mode, to transfer data to said ALU via one or more of said ports directly to said ALU, or from one or more of said registers to said ALU,
　during said execute mode, to transfer data from said ALU directly to one or more of said ports, or to one or more of said registers, and during said output mode, to transfer data from said data registers via said ports to said common main memory;
the parallel digital processor further including a transfer bus network for selectively interconnecting said ALU's and registers of said PPM's during said execute mode.

8. A parallel digital processor according to claim 7 further comprising:
　a main memory organized in columns and rows and wherein a separate column of memory is associated each of said ports of said PPM's.

9. A parallel digital processor according to claim 7 further comprising:
　at least one additional data register not associated with a port, said additional register being operative to receive data from said ALU during execution of one instruction and to supply said data to said ALU during an execution of a subsequent instruction.

10. A parallel digital processor according to claim 7 further comprising:
　a latch associated with each of said data registers to receive data from the respective data register and to drive said ALU during the execute mode when data is transferred from a data register to said ALU, and
　means coupling a output of said ALU during the execute mode when data is transferred from said ALU to one of said registers.

11. A general purpose parallel digital processor comprising a plurality of parallel processing modules (PPM's) each including;
　a program register for storing instruction code; at least two data registers for storing data to be processed;
　a separate port for each of said registers to permit simultaneous transfer of data and code to said respective registers;
　an arithmetic logic unit (ALU) coupled to receive data from said data registers;
　a instruction decoder
　　responsive to instruction code stored in said program register, and
　　operative to control said ALU to process data from said data registers according to instructions from said program register;
　a transfer control circuit operative in at least an input mode, an execute mode, and an output mode, said transfer control circuit being operative
　　during said input mode, to transfer data to said registers via said ports,
　　during said execute mode, to transfer data to said ALU via one or more of said ports directly to said ALU, or from one or more of said registers to said ALU,
　　during said execute mode, to transfer data from said ALU directly to one or more of said ports, or to one or more of said registers, and during said output mode, to transfer data from said data registers via said ports;
　a plurality of segmented lateral transfer buses for interconnecting the PPM's during execute operations;
　each transfer bus including switches for selectively coupling said bus to ports of the PPM's; and
　each transfer bus further including interrupt switches for selectively interrupting the transfer bus to form a plurality of segments each capable of interconnecting two or more PPM's via said ports.

12. A parallel digital processor according to claim 11 further comprising:
　a main memory organized in columns and rows and wherein a separate column of memory is associated with each of said ports of said PPM's for transfer of data to and from said ports at times other than said execute operations.

13. A parallel digital processor according to claim 11 further comprising:
　a lateral switch control associated with each PPM;
　　to control said switches for selectively coupling the ports of the associated one of said PPM's to said lateral transfer buses, and
　　to control said interrupt switches of the associated one of said PPM's, and
wherein said main memory further includes a column of memory associated with each lateral switch control.

14. A parallel digital processor comprising:
　a main memory organized in columns and rows;
　a plurality of parallel processing modules (PPM's) each including at least one port for receiving instructions and one or more ports for receiving data, said PPM's each being capable of processing received data according to received instructions during an execute mode;
　each of said ports of each of said PPM's being connected to receive digital indications from a different column of said main memory;
　a program sequencer for operating the parallel processor in at least an input mode, said execute mode, and an output mode, said program sequencer being operative
　　to transfer a selected row from memory to said ports of said PPM's in parallel during said input mode, and
　　to transfer data from said ports of said PPM's in parallel to a selected row of said main memory during said output mode.

15. A parallel processor according to claim 14 wherein said main memory further includes a column of said main memory for supplying instructions and data to said program sequencer.

16. A parallel processor according to claim 15 wherein said program sequencer normally advances one row of said main memory during each subsequent input mode operation but can jump to other rows of said main memory in accordance with received instructions.

17. A parallel processor according to claim 16 wherein said program sequencer during said output mode normally returns data to the same row of said main memory as used during the prior input mode but can return data to other rows offset therefrom in accordance with received instructions.

18. A parallel processor according to claim 17 wherein said PPM's include a register associated with each of said ports and at least one additional register for storing data resulting from one execute mode operation for use during a subsequent execute mode operation, and wherein said output mode is optional.

19. A parallel digital processor including parallel comparison logic comprising:

a plurality of parallel processing modules (PPM's) each including
a program register for storing instruction code,
at least two data registers for storing data to be processed,
a separate parallel port for each of said registers to permit simultaneous transfer of data to each of said registers,
an arithmetic logic unit (ALU) coupled to receive data from said data registers,
an instruction decoder
responsive to instructions stored in said program register, and
operative to control said ALU to process data from said data registers according to instructions from said program register,
a comparison logic circuit connected to receive results from data comparison performed in said ALU
a chain circuit for interconnecting each comparison logic circuit with comparison logic circuits in neighboring PPM's;
a comparison bus connected to each of said comparison logic circuits; and
circuit means in each of said PPM's for controlling the ALU output data path in accordance with the status of said comparison bus.

* * * * *